(12) United States Patent
Bhadgaonkar et al.

(10) Patent No.: US 12,415,504 B2
(45) Date of Patent: Sep. 16, 2025

(54) METHOD FOR OPERATING A VEHICLE, PARKING ASSISTANCE SYSTEM AND VEHICLE

(71) Applicant: Valeo Schalter und Sensoren GmbH, Bietigheim-Bissingen (DE)

(72) Inventors: Sharad Shivajirao Bhadgaonkar, Bietigheim-Bissingen (DE); Stefanie Prinzhausen, Bietigheim-Bissingen (DE); Cedric Langer, Bietigheim-Bissingen (DE); Wolfgang Gaim, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 250 days.

(21) Appl. No.: 17/908,705

(22) PCT Filed: Feb. 22, 2021

(86) PCT No.: PCT/EP2021/054267
§ 371 (c)(1),
(2) Date: Sep. 1, 2022

(87) PCT Pub. No.: WO2021/175631
PCT Pub. Date: Sep. 10, 2021

(65) Prior Publication Data
US 2023/0159020 A1    May 25, 2023

(30) Foreign Application Priority Data
Mar. 2, 2020  (DE) .................... 10 2020 105 434.3

(51) Int. Cl.
*B60W 30/06*    (2006.01)
(52) U.S. Cl.
CPC ......... *B60W 30/06* (2013.01); *B60W 2510/20* (2013.01)

(58) Field of Classification Search
None
See application file for complete search history.

(56) References Cited

U.S. PATENT DOCUMENTS

| | | | | |
|---|---|---|---|---|
| 2004/0267423 A1* | 12/2004 | Iwazaki | ............. | B62D 15/0285 701/41 |
| 2013/0006473 A1* | 1/2013 | Buerkle | ............... | B62D 15/025 701/41 |

(Continued)

FOREIGN PATENT DOCUMENTS

| | | |
|---|---|---|
| CN | 101426671 A | 5/2009 |
| CN | 102398596 A | 4/2012 |

(Continued)

OTHER PUBLICATIONS

Machine translation of EP-3378737-A1 (Year: 2018).*

(Continued)

*Primary Examiner* — Anne Marie Antonucci
*Assistant Examiner* — Kyle S Park
(74) *Attorney, Agent, or Firm* — Osha Bergman Watanabe & Burton LLP (57) ABSTRACT

A method for operating a vehicle by a parking assistance system in a following mode where the vehicle is driven along a trained trajectory or to initiate driving is disclosed. The method involves receiving the trained trajectory in a training mode in which a manually navigated trajectory is recorded as the trained trajectory. The trained trajectory has a strongly curved section, the radius of curvature of which is smaller than a radius that can be achieved with the vehicle with a maximum permissible steering lock predefined in the following mode. The method determines a starting point and an end point of the strongly curved section, ascertaining a substitute trajectory which connects a substitute starting point to a substitute end point. The substitute points are each (Continued)

on the trained trajectory and the strongly curved section is between the substitute points.

15 Claims, 7 Drawing Sheets

(56) References Cited

U.S. PATENT DOCUMENTS

| | | | |
|---|---|---|---|
| 2013/0085637 | A1 | 4/2013 | Grimm et al. |
| 2015/0198953 | A1* | 7/2015 | Peake .................. B62D 15/025 |
| | | | 701/23 |
| 2020/0346639 | A1* | 11/2020 | Tashiro .................. G08G 1/168 |

FOREIGN PATENT DOCUMENTS

| | | |
|---|---|---|
| CN | 105197010 A | 12/2015 |
| CN | 106114623 A | 11/2016 |
| CN | 107618502 A | 1/2018 |
| CN | 108045436 A | 5/2018 |
| CN | 108146424 A | 6/2018 |
| CN | 110497913 A | 11/2019 |
| CN | 110696818 A | 1/2020 |
| DE | 102008002598 A1 | 1/2009 |
| DE | 102017002731 A1 | 9/2018 |
| DE | 102017114605 A1 | 1/2019 |
| DE | 102018117718 A1 | 1/2020 |
| EP | 3378737 A1 * | 9/2018 ............ B60W 30/06 |
| EP | 3401190 A1 | 11/2018 |
| JP | 2004-352110 A | 12/2004 |
| JP | 2013-530867 A | 8/2013 |
| JP | 2019-137086 A | 8/2019 |

OTHER PUBLICATIONS

Machine translation of JP 2004352110 A (Year: 2004).*
Machine translation of JP 2019137086 A (Year: 2019).*
Machine translation of CN 105197010 A (Year: 2015).*
Japanese Office Action issued in Japanese Application No. 2022-552675 mailed on Jul. 4, 2023 (10 pages).
Notice of Preliminary Rejection in corresponding Korean Application No. 2022-7030100, dated Apr. 22, 2024 (12 pages).
Office Action Issued in corresponding CN Application No. 202180018804.2, dated May 25, 2023. (24 pages with English Translation).
International Search Report and Written Opinion in corresponding International Application No. PCT/EP2021/054267, mailed May 21, 2021 (13 pages).
German Search Report in corresponding German Application No. 10 2020 105 434.3, dated Sep. 30, 2020 (4 pages).

* cited by examiner

METHOD FOR OPERATING A VEHICLE, PARKING ASSISTANCE SYSTEM AND VEHICLE

The present invention relates to a method for operating a vehicle, to a parking assistance system and to a vehicle.

Parking assistance systems for vehicles, which, in a training mode, can be trained by a user to follow a specific trajectory with the vehicle, for example from a courtyard entrance into a garage, are known. For this purpose, the trajectory navigated manually by the user is recorded. When following later, the parking assistance system automatically carries out the control actions undertaken by the user during training, as a result of which the vehicle follows the trajectory.

DE 10 2017 002 731 A1 describes a method for operating a motor vehicle. The method includes manually guiding the motor vehicle along a first trajectory during a first parking process, in particular an entry parking process. The first trajectory is recorded during the first parking process. In addition, a second trajectory is determined by applying a smoothing method to the first trajectory and/or by adapting the first trajectory to environmental data captured during the first parking process, in particular to obstacles and/or obstacle-free areas determined from the captured environmental data.

For technical reasons, a very high or even maximum steering lock, which can be easily turned to by the user when training the trajectory, cannot be achieved in the following mode. Provision is therefore made for the parking assistance system to interrupt the training of the trajectory if the user exceeds an upper limit value for the steering lock. The trajectory is then not saved and is not available for following. If the parking assistance system still trains and stores the trajectory, the problem can arise that the vehicle deviates from the trained trajectory when following the trained trajectory, which can at best lead to the following maneuver being aborted, and at worst to the vehicle colliding with an obstacle.

Against this background, one object of the present invention is to improve the operation of a vehicle.

A first aspect proposes a method for operating a vehicle by means of a parking assistance system which is configured, in a following mode, to drive the vehicle along a trained trajectory or to initiate driving of the vehicle. In a first step a), the trained trajectory which in a training mode in which a manually navigated trajectory is recorded as the trained trajectory is received. "Receive" in this case means in particular that at least raw measurement data from sensor-based recording of the trajectory are provided. The trained trajectory is preferably recorded beforehand in a sensor-based manner, in particular with the aid of at least one vehicle sensor, such as an ultrasonic sensor and/or a camera sensor and/or a GPS sensor and/or a radar sensor and/or a lidar sensor and/or an odometry sensor. The trained trajectory comprises at least one strongly curved section, the radius of curvature of which is smaller than a radius that can be achieved with the vehicle with a maximum permissible steering lock predefined in the following mode. In a second step b), a starting point and an end point of the strongly curved section in the trained trajectory are determined. Determining also comprises stipulating and/or detecting. In a third step c), a substitute trajectory which connects a substitute starting point to a substitute end point is ascertained. The substitute starting point and the substitute end point are each on the trained trajectory and the strongly curved section is between the substitute starting point and the substitute end point. A maximum curvature of the substitute trajectory has a radius of curvature that can be achieved with the maximum permissible steering lock predefined in the following mode or with a smaller steering lock.

This method has the advantage that, on the one hand, trajectories that comprise very tight curves can be trained in a training mode and, on the other hand, the trained trajectory can be successfully followed in the following mode without the vehicle moving too far away from the trained trajectory. The method is preferably used where the traffic situation does not necessarily require a maximum steering lock used by the user when training the trajectory. The steering lock or steering angle is understood as meaning, for example, an angle between a wheel axis of rotation of a steering wheel and a transverse direction of the vehicle or between a wheel rolling direction and a longitudinal direction of the vehicle.

The parking assistance system, which can also be referred to as a driver assistance system, is configured in particular for partially autonomous or fully autonomous driving of the vehicle. Partially autonomous driving is understood as meaning, for example, that the parking assistance system controls a steering apparatus and/or an automatic speed level system. Fully autonomous driving is understood as meaning, for example, that the parking assistance system also additionally controls a drive device and a braking device. The parking assistance system may be implemented in the form of hardware and/or in the form of software. In the case of an implementation in the form of hardware, the parking assistance system may be, for example, in the form of a computer or a microprocessor. In the case of an implementation in the form of software, the parking assistance system may be in the form of a computer program product, a function, a routine, part of a program code or an executable object. In particular, the parking assistance system may be in the form of part of a superordinate control system of the vehicle, for example an ECU (Engine Control Unit).

The vehicle is, for example, an automobile or even a truck. In particular, the vehicle comprises a number of sensor units which are configured to capture the driving state of the vehicle and to capture an environment of the vehicle. Examples of such sensor units of the vehicle are image recording devices such as a camera, a RADAR or a LIDAR, ultrasonic sensors, a location sensor, wheel angle sensors and/or wheel speed sensors. The sensor units are each configured to output a sensor signal, for example to the parking assistance system which carries out the partially autonomous or fully autonomous driving on the basis of the captured sensor signals.

To train a trajectory, the parking assistance system is put into a training mode by the user, for example. In the training mode, the parking assistance system preferably records all of the user's control inputs, for example a steering angle, an engaged gear, a distance covered, and the like. The corresponding values are preferably stored in relation to each other, with the result that, for example, the steering angle is available as a function of the wheel revolutions. The trained trajectory is thus clearly defined, at least in the case of a non-slip drive. In addition to these data, which are also referred to as odometry data, sensor signals from environmental sensors of the vehicle are preferably also recorded during training. This can facilitate orientation of the parking assistance system, in particular in the following mode.

A special feature here is that the trajectory is also recorded when a higher steering angle is used than can be achieved in the following mode. Very high steering angles, for example a maximum lock, require a very high torque. The user can easily achieve the torque using the steering wheel and the servomotor, but this is a very high load for an actuator for controlling the steering angle during autonomous driving. In order to keep a risk of rapid wear or premature failure of the actuator low, the maximum steering angle that can be achieved in the autonomous driving mode can therefore be reduced, for example it is 80% or 90% of the design-related maximum steering angle. The maximum steering angle that can be achieved in the following mode can also be referred to below as the limit steering angle.

The greater the steering angle, the greater the curvature of the trajectory generated therewith and the smaller a radius of curvature of a circle of curvature or an osculating circle. Accordingly, a trajectory that can be navigated in the following mode has a maximum limit curvature and a minimum limit radius of curvature. A higher curvature than the limit curvature and a smaller radius of curvature than the limit radius of curvature therefore cannot be achieved.

The trained trajectory can also comprise a plurality of sections whose curvature is higher than the limit curvature. The respective trajectory, for example the trained trajectory and the substitute trajectory, relates, for example, to a reference point, in particular the center point, center of gravity or center point of the rear axle of the vehicle. Alternatively or additionally, trajectories for one or more wheels of the vehicle can be recorded and/or ascertained and/or received, and/or a trajectory for one or more corner points of a body of the vehicle.

The starting point and the end point of the strongly curved section can already be determined while the trajectory is being recorded or trained. For example, a data point in the odometry data that corresponds to a point in time at which the user exceeds the limit steering angle or falls below it again is marked accordingly. Alternatively, provision may be made for the curvature of the trajectory to be analyzed at each point of the trajectory and for connected portions whose curvature exceeds the limit curvature to be marked accordingly only when the following mode has been activated and the corresponding trajectory has been selected. The first point of such a portion is then the starting point and the last point of the portion is the end point.

A substitute trajectory, the maximum curvature of which does not exceed the limit curvature, is then ascertained for the strongly curved section. The substitute starting point and substitute end point of the substitute trajectory are both on the trained trajectory and also include the strongly curved section. This ensures that the substitute trajectory deviates as little as possible from the trained trajectory and that the vehicle is on the trained trajectory again after following the substitute trajectory.

In the case of complex trained trajectories that have a plurality of strongly curved sections close together, such as an S-bend, provision may be made for a substitute trajectory to be ascertained for individual ones of the strongly curved sections, with a substitute starting point and/or a substitute end point of the respective substitute trajectory not being on the trained trajectory. The plurality of substitute trajectories determined in this way are then connected to form an overall substitute trajectory whose starting point and end point are on the trained trajectory. In this case, the overall substitute trajectory does not necessarily comprise the entire course of the plurality of substitute trajectories; rather, these can be partially shortened. For example, transition points, at which there is a transition from a first substitute trajectory to a second, subsequent substitute trajectory, are ascertained for this purpose. Such a transition point may be between the substitute starting point and the substitute end point of a respective substitute trajectory.

In embodiments, the substitute trajectory ascertained is stored, with it being possible in particular to store information as to whether the substitute trajectory ascertained was able to be followed successfully. It is then possible to resort to the stored trajectory the next time the user wants to have the trained trajectory followed. This can reduce a required computational effort.

According to one embodiment of the method, the substitute trajectory runs at least in sections within the strongly curved section, and/or the substitute trajectory has a section whose curvature is negative in comparison with the curvature of the strongly curved section, and/or the substitute trajectory comprises a number of travel direction change sections.

The fact that the substitute trajectory runs within the strongly curved section is understood as meaning, for example, that the circle of curvature or osculating circle, which is a circle drawn with the radius of curvature and lying against the strongly curved section, is intersected.

A negative curvature means that the curvature runs in the other direction in the same travel direction, which corresponds to a change in the travel direction from a left turn to a right turn or vice versa. It is also possible to refer to a convex or concave curvature. It can also be stated that the circle of curvature is on the other side of the trajectory.

A travel direction change section is understood as meaning that the vehicle changes the travel direction in this portion, i.e. changes from forward travel to reverse travel or vice versa.

According to a further embodiment of the method, the substitute starting point is before the starting point of the strongly curved section on the trained trajectory in relation to a travel direction of the vehicle, and/or the substitute end point is after the end point of the strongly curved section on the trained trajectory in relation to a travel direction of the vehicle.

This ensures that the substitute trajectory completely encloses the strongly curved section and, for example, that an end point of the trained trajectory can be approached safely.

According to a further embodiment of the method, the substitute trajectory is shorter than the strongly curved section.

This is the case in particular when the substitute trajectory runs for the most part or completely within the strongly curved section.

According to a further embodiment of the method, a maximum offset between the trained trajectory and the substitute trajectory is smaller than a predefined limit value.

The offset can also be referred to as a distance. In particular, the maximum offset at a specific position of the substitute trajectory is the shortest distance to a point along the trained trajectory. The predefined limit value is, for example, 1 m, 2 m, 3 m, 4 m or up to 5 m. Different limit values for the maximum offset can be provided in this case for different environments, such as an underground parking garage, a parking block, a parking area in a yard or along a street.

A geometry of the vehicle is preferably also taken into account here, with the result that, for example, a different orientation of the vehicle also contributes to the offset. For example, the geometry of the vehicle can be approximated by the footprint covered by the vehicle. Various dimensions can be introduced here as an offset. For example, all points that are outside an area covered by the vehicle in the training mode can be specified as an offset. Alternatively, a mean value or an RMS value of a shortest distance between these points and the area covered can also be defined as an offset.

This embodiment ensures that the vehicle does not move too far away from the trained trajectory when following the substitute trajectory.

According to a further embodiment of the method, the substitute trajectory comprises at least one travel direction change section whose curvature is smaller than the curvature of the substitute trajectory at a section starting point of the travel direction change section, preferably zero, preferably negative.

It can also be stated that countersteering takes place in the travel direction change section. In this way, a deviation in an orientation of the vehicle compared to an orientation of the vehicle on the trained trajectory can be corrected particularly efficiently.

According to a further embodiment of the method, an opening angle between a first tangent to the substitute trajectory at the section starting point of the respective travel direction change section of the number and a second tangent to the trained trajectory at a point corresponding to the section starting point is greater than or equal to a predefined limit value.

The corresponding point is, for example, that point on the trained trajectory which has the shortest distance to the section starting point. The predefined limit value for the opening angle is, for example, 15°, 20°, 25°, 30°, 35°, 40° or up to 45°. Different limit values can be provided in this case for different environments, such as an underground parking garage, a parking block, a parking area in a yard or along a street.

According to a further embodiment of the method, the substitute trajectory comprises a travel direction change section in each case after a predefined distance along the substitute trajectory.

The predefined distance can be defined as a distance covered. However, the predefined distance can also relate to a change in direction; for example, a travel direction change section can be provided in each case after a 45° bend or a 90° bend.

According to a further embodiment of the method, the substitute trajectory has a negative curvature with respect to the strongly curved section in a starting portion, which directly follows the substitute starting point, and/or in an end portion which directly follows the substitute end point.

According to a further embodiment of the method, the substitute starting point, the substitute end point and the substitute trajectory are ascertained by means of an iterative optimization method.

Iterative optimization methods are particularly suitable for taking into account various predefined limit values, such as a maximum permissible offset and/or opening angle. Furthermore, dynamically changing situations, such as mobile objects or obstacles, can be taken into account with iterative optimization methods.

In embodiments, environmental sensor data which are provided by environmental sensors of the vehicle and/or by external environmental sensors are taken into account in the ascertainment.

This embodiment is advantageous because changes in the traffic situation over time, such as mobile obstacles, are taken into account when ascertaining the substitute trajectory.

According to a further embodiment of the method, the vehicle is localized at a localization position on the trained trajectory which is in front of the starting point of the strongly curved section.

Localization is understood here as determining the location of the vehicle. The location can be specified, for example, by means of coordinates on a spherical surface that describes the earth and can be ascertained in particular with the aid of a satellite-based system such as GPS. However, the location can also be determined in relation to fixed objects, such as buildings or a road marking. The localization can be performed by an internal device on the basis of environmental sensor data or by an external device such as an external camera or the like.

In embodiments, the position of the vehicle may be ascertained using odometry while following the trained trajectory. As an alternative to this, the localization of the vehicle can be repeated periodically or as required. This makes it possible to avoid drifting of the actual location, for example due to inaccuracies in the first localization and/or during odometry.

According to one embodiment of the method, the maximum permissible steering angle predefined in the following mode is different for left and right.

Due to design-related differences in a wheel suspension and the like, there may be differences in the steering behavior of the vehicle, which can be taken into account hereby.

A second aspect proposes a computer program product comprising instructions that, when the program is executed by a computer, cause said computer to perform the method described above.

A computer program product, such as a computer program means, may be provided or delivered, for example, as a storage medium such as a memory card, a USB stick, a CD-ROM, a DVD, or in the form of a downloadable file from a server in a network. This may take place, for example, in a wireless communication network by transmitting a corresponding file containing the computer program product or the computer program means.

A third aspect proposes a parking assistance system for a vehicle which is configured, in a following mode, to drive the vehicle along a trained trajectory. The parking assistance system comprises a computing unit for receiving the trained trajectory which is a trajectory navigated manually during a training mode, wherein the trained trajectory comprises at least one strongly curved section, the radius of curvature of which is smaller than can be achieved with the vehicle with a maximum permissible steering lock predefined in the following mode. Furthermore, the parking assistance system comprises a determination unit for determining a starting point and an end point of the strongly curved section in the trained trajectory, and an ascertainment unit for ascertaining a substitute trajectory which connects a substitute starting point to a substitute end point. The substitute starting point and the substitute end point are on the trained trajectory and the strongly curved section is between the substitute starting point and the substitute end point, and a maximum curvature of the substitute trajectory has a radius of curvature that can be achieved with the maximum permissible steering lock predefined in the following mode or a smaller steering lock.

This parking assistance system has the same advantages as explained for the method of the first aspect. The embodiments and features proposed for the method described apply accordingly to the proposed parking assistance system. The parking assistance system is operated in particular with the method according to the first aspect.

The respective unit, for example the computing unit, the determination unit and/or the ascertainment unit, and the parking assistance system can be implemented in the form of hardware and/or software. In the case of an implementation in the form of hardware, the unit may be, for example, in the form of a computer or a microprocessor. In the case of an implementation in the form of software, the unit may be in the form of a computer program product, a function, a routine, part of a program code or an executable object.

A fourth aspect proposes a vehicle having a parking assistance system according to the third aspect.

The vehicle is preferably an automobile or a truck.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below.

The invention is explained in more detail below on the basis of preferred embodiments with reference to the accompanying figures.

Identical or functionally identical elements have been provided with the same reference signs in the figures, unless stated otherwise.

Figure 1:
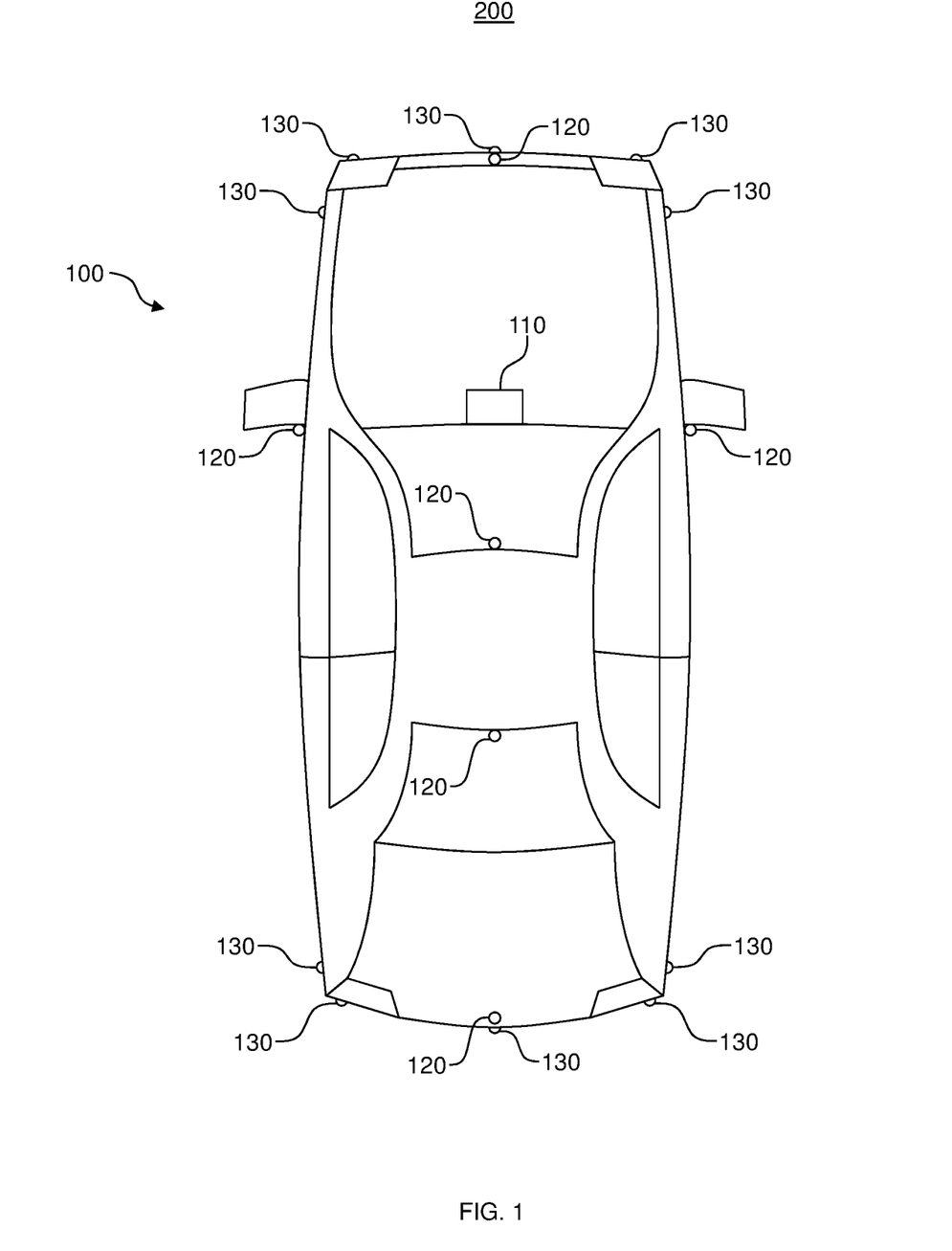
FIG. 1 shows a schematic view of a vehicle from a bird's eye view.

FIG. 1 shows a schematic view of a vehicle 100 from a bird's eye view. The vehicle 100 is, for example, an automobile that is arranged in an environment 200. The automobile 100 has a parking assistance system 110 which is in the form of a control device, for example. In addition, a plurality of sensor devices 120, 130 are arranged on the automobile 100, these being for example optical sensors 120 and ultrasonic sensors 130. The optical sensors 120 comprise, for example, visual cameras, a RADAR (radio detection and ranging) and/or a LIDAR (light detection and ranging). The optical sensors 120 may each capture an image of a respective region from the environment 200 of the automobile 100 and output it as an optical sensor signal. The ultrasonic sensors 130 are configured to detect a distance from objects arranged in the environment 200 and to output a corresponding sensor signal. Using the sensor signals captured by the sensors 120, 130, the parking assistance system 110 is able to drive the automobile 100 partially autonomously or even fully autonomously. In addition to the optical sensors 120 and ultrasonic sensors 130 illustrated in FIG. 1, provision may be made for the vehicle 100 to have various other sensor devices 120, 130. Examples of these are a microphone, an acceleration sensor, an antenna having a coupled receiver for receiving electromagnetically transmissible data signals, and the like. The vehicle 100 also preferably comprises a localization unit (not shown) which is configured to detect a position of the vehicle 100 in the environment 200 and to output it to the parking assistance system 110.

The parking assistance system 110 is configured to drive the vehicle 100 along a trained trajectory TR (see FIGS. 2-6) in a following mode. The parking assistance system 110 comprises, for example, a computing unit 111 (see FIG. 8), a determination unit 112 (see FIG. 8) and an ascertainment unit 113 (see FIG. 8).

Figure 2:
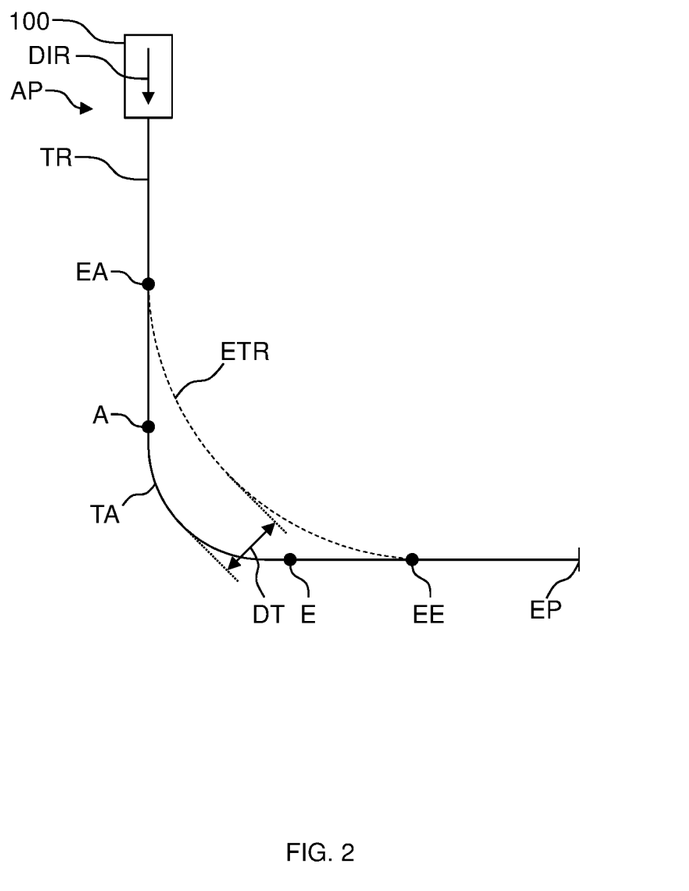
FIG. 2 schematically shows a first example of a substitute trajectory.

FIG. 2 schematically shows a first example of a substitute trajectory ETR which was ascertained on the basis of a trained trajectory TR. The trained trajectory TR begins at a starting position AP, at which the vehicle 100 is indicated with the intended travel direction DIR, and ends at an end position EP. The trained trajectory TR has a strongly curved section TA which begins at a starting point A and extends to an end point E and describes a 90° bend in this case. The steering lock that is needed to follow the strongly curved section TA with the vehicle 100 is higher than a maximum permissible steering lock in the following mode of the parking assistance system 110 (see FIG. 1 or 8). The parking assistance system 110 therefore ascertains a substitute trajectory ETR which connects a substitute starting point EA to a substitute end point EE and the curvature of which is achieved with a steering lock that can be achieved in the following mode. The substitute starting point EA is on the trained trajectory TR before the starting point A of the strongly curved section TA. The substitute end point EE is on the trained trajectory TR after the end point E of the strongly curved section TA. The substitute trajectory ETR thus intersects the bend defined by the strongly curved section TA. By virtue of the parking assistance system 110 following the trained trajectory TR using the substitute trajectory ETR, the vehicle 100 arrives at the end position EP from the starting position AP without the limit steering angle being exceeded and without a maximum deviation DT from the trained trajectory TR exceedings an upper limit value. The upper limit value for the maximum offset DT is preferably predefined and can be different for different trained trajectories TR or for different sections along the trained trajectory TR. Furthermore, the upper limit value for the maximum offset DT can be predefined on the basis of a nature of the environment 200 (see FIG. 1), in particular of obstacles or objects present in the environment 200. It should also be noted that the maximum permissible offset DT does not have to be exhausted. The substitute trajectory ETR is preferably ascertained in such a way that the maximum offset at each point is minimal.

Figure 3:
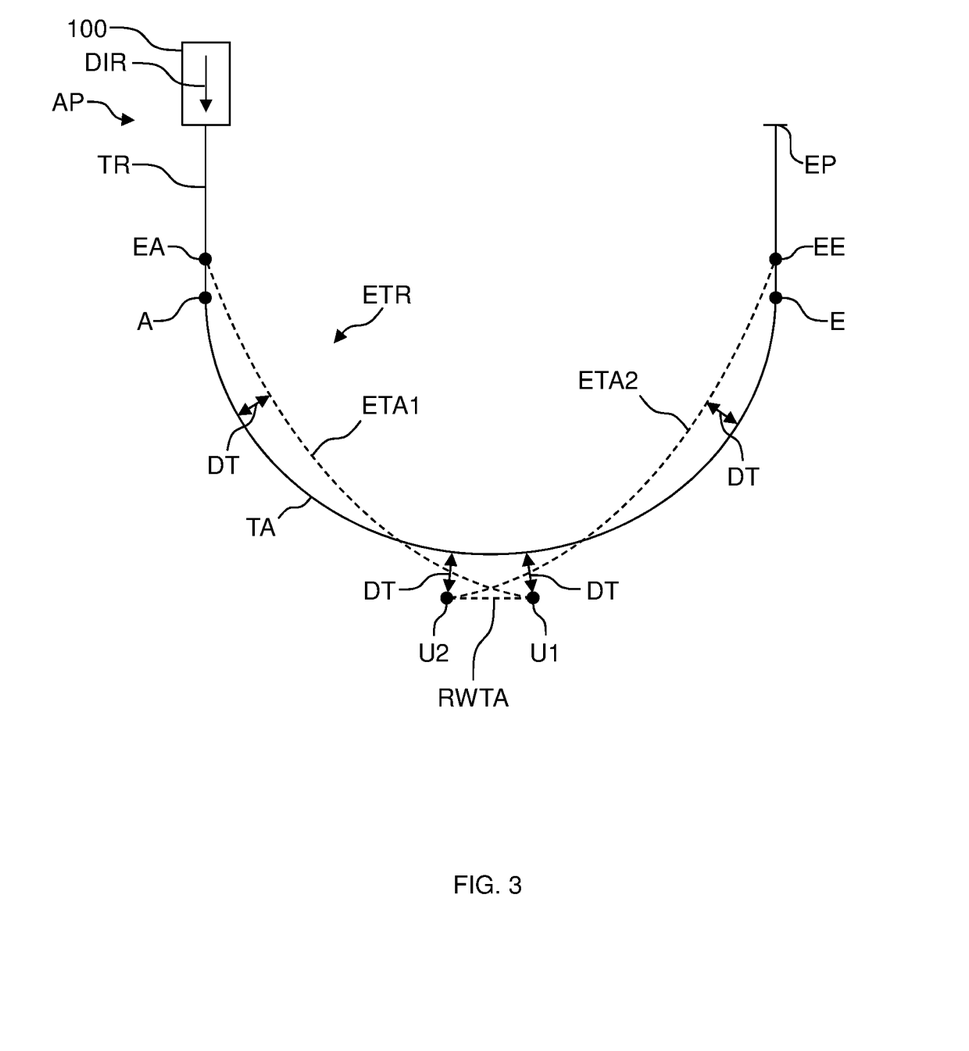
FIG. 3 schematically shows a second example of a substitute trajectory.

FIG. 3 schematically shows a second example of a substitute trajectory ETR for a trained trajectory TR, which in the present case has a strongly curved section TA that describes a 180° bend. The curvature of the strongly curved section TA is higher than a maximum curvature that can be achieved in the following mode. The substitute trajectory ETR here comprises three sections, a first section ETA1, a second section ETA2 and a travel direction change section RWTA. The curvature of the substitute trajectory ETR is less than or equal to the maximum permissible curvature at every point. The first section ETA1 connects the substitute starting point EA, which is on the trained trajectory TR, to a first reversal point U1, at which the travel direction change is carried out. The travel direction change section RWTA connects the first reversal point U1 to a second reversal point U2, at which a further travel direction change is carried out. The travel direction DIR of the vehicle 100 in the travel direction change section RWTA is therefore opposite to the travel direction DIR of the vehicle 100 at the other points of the substitute trajectory ETR. The second section ETA2 connects the second reversal point U2 to the substitute end point EE which is again on the trained trajectory TR.

It can be seen that the substitute trajectory ETR runs partly inside and partly outside the strongly curved section TA. The travel direction change section RWTA was ascertained in such a way that a maximum permissible offset DT with respect to the trained trajectory TR is not exceeded. The maximum permissible offset DT is, for example, 0.3 m, 0.5 m, 1 m, 2 m, 3 m, 4 m or up to 5 m, a distance between the two trajectories being defined as an offset DT, for example. By reversing the vehicle 100 in the travel direction change section RWTA, it is ensured here, for example, that the substitute trajectory ETR does not continue to the right beyond the trained trajectory TR, which could be blocked by a structural obstacle (not shown), for example.

It should be noted that the substitute trajectory ETR can also be ascertained in such a way that it runs completely within the strongly curved section TA, for example by moving the substitute starting point EA even further in the direction of the starting position AP and moving the substitute end point EE even further in the direction of the end position EP and/or by inserting a plurality of travel direction change sections RWTA which are then each within the strongly curved section TA. In this case, the substitute trajectory ETR would then no longer intersect or cross the trained trajectory TR.

Figure 4:
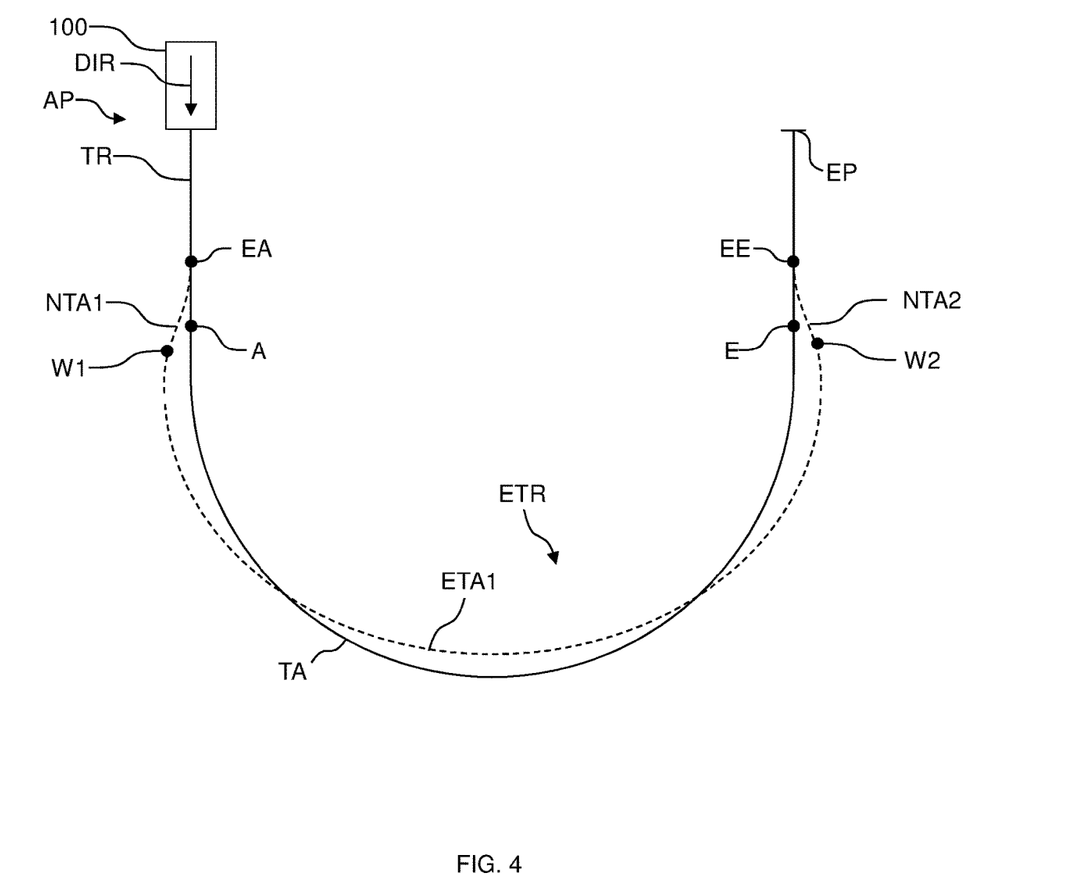
FIG. 4 schematically shows a third example of a substitute trajectory.

FIG. 4 schematically shows a third example of a substitute trajectory ETR for a trained trajectory TR, which in the present case has a strongly curved section TA that describes a 180° bend. The curvature of the strongly curved section TA is higher than a maximum curvature that can be achieved in the following mode. In this case, the substitute trajectory ETR manages without a travel direction change section RWTA (see FIG. 3 or 5). Instead, the substitute trajectory ETR has a negative curvature in a starting portion NTA1 and an end portion NTA2 in comparison with the curvature of the strongly curved section TA. The starting portion NTA1 extends from the substitute starting point EA to a turning point W1 where the curvature becomes positive again. The end portion NTA2 extends from a turning point W2, where the curvature becomes negative, to the substitute end point EE.

It can be seen that the substitute trajectory ETR does not exceed the trained trajectory TR in a direction parallel to the starting travel direction DIR of the vehicle 100. Furthermore, a maximum permissible offset DT (see FIG. 2 or 3) with respect to the trained trajectory TR is not exceeded (not illustrated).

Figure 5:
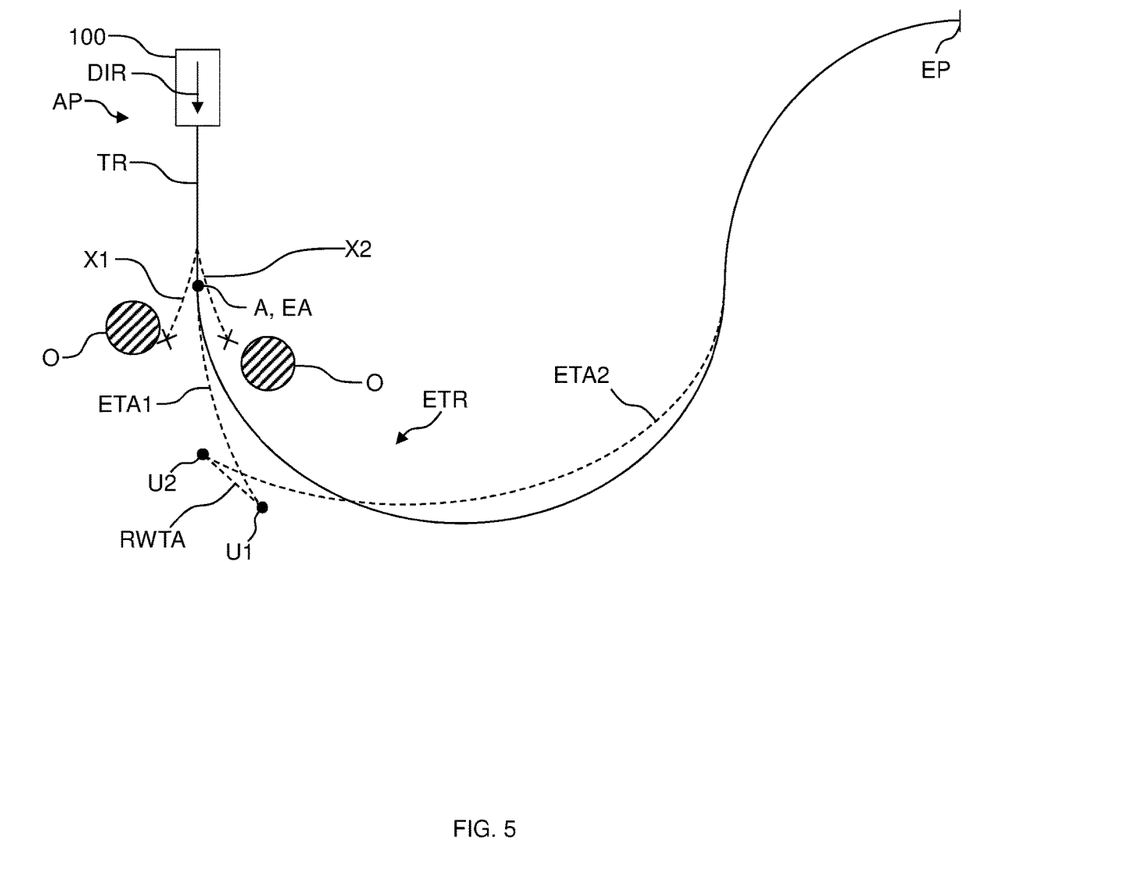
FIG. 5 schematically shows a fourth example of a substitute trajectory.

FIG. 5 schematically shows a fourth example of a substitute trajectory ETR. In this example, there are two obstacles O, which can be fixed obstacles or mobile obstacles, next to the trained trajectory TR. The trained trajectory TR has a strongly curved section TA, which describes a 180° bend, followed by a portion that describes a 90° bend, the curvature of which does not exceed the maximum permissible curvature. Substitute trajectories ETR, as described above with reference to FIGS. 3 and 4, are not possible since this could lead to a collision with one of the obstacles O. This is indicated by the trajectories X1, X2. Therefore, the substitute trajectory ETR is ascertained as follows. The substitute starting point EA here corresponds to the starting point A of the strongly curved section TA. A first substitute section ETA1 runs outside the strongly curved section TA to a first reversal point U1. This is followed by a travel direction change section RWTA up to a second reversal point U2. The trained trajectory TR is intersected in a second substitute section ETA2, with the result that the second substitute section ETA2 runs partly outside and partly inside the strongly curved section TA.

This example shows that the substitute trajectory ETR can be generated or constructed as desired using the concepts described, in particular using portions of negative curvature NTA1, NTA2 (see FIG. 4) and using travel direction change sections RWTA. A very high level of flexibility is therefore made possible upon finding a suitable substitute trajectory ETR. The substitute trajectory ETR can therefore also be successfully ascertained in changing situations, such as in the case of new and/or mobile obstacles O and the like. In particular, it is ensured that a maximum permissible offset DT (see FIG. 2 or 3) with respect to the trained trajectory TR is not exceeded (not illustrated).

Figure 6:
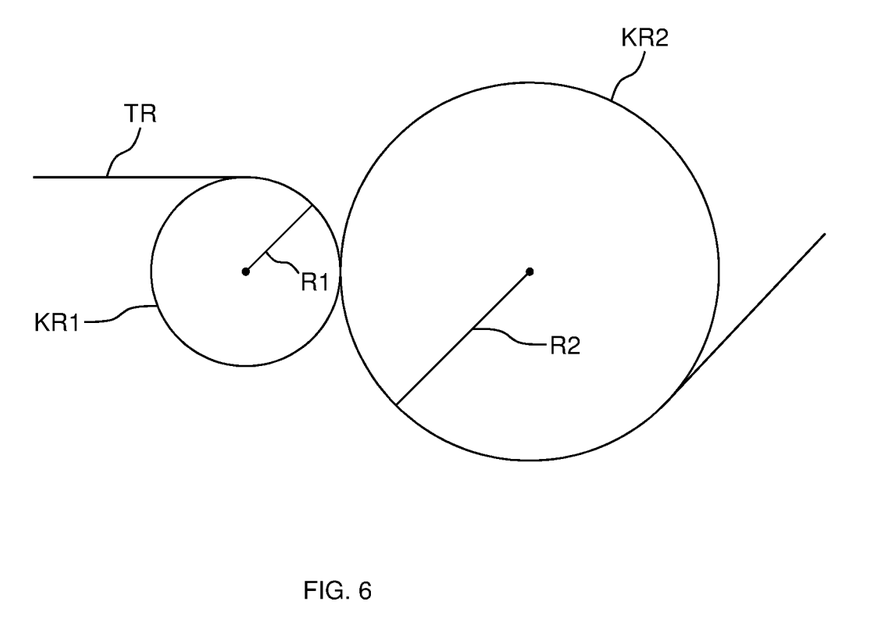
FIG. 6 schematically shows a trajectory with circles of curvature.

FIG. 6 schematically shows a trajectory TR with circles of curvature KR1, KR2. The circle of curvature KR has a radius of curvature R1, and the circle of curvature KR2 has a radius of curvature R2. The circles of curvature KR1, KR2 can also be referred to as osculating circles. The curvature of the trajectory TR is negative in that portion which is described by the circle of curvature KR1 in comparison the curvature of the trajectory TR in that section which is described by the circle of curvature KR2.

A substitute trajectory ETR (see FIGS. 2-5) is referred to as running within the strongly curved section TA (see FIGS. 2-5) if it intersects the corresponding circle of curvature KR1, KR2 on the trained trajectory TR, i.e. runs within the circle of curvature KR1, KR2.

Figure 7:
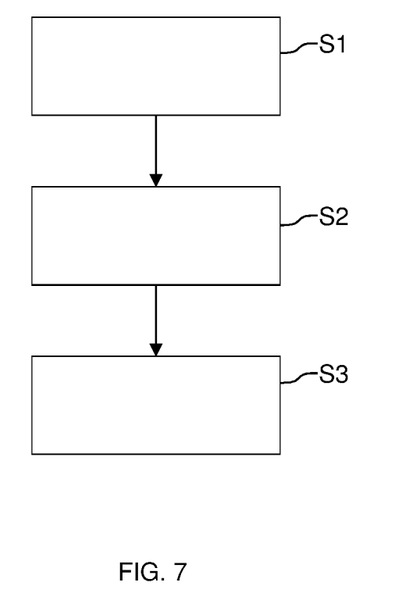
FIG. 7 shows a schematic block diagram of an exemplary embodiment of a method for operating a parking assistance system.
Figure 8:
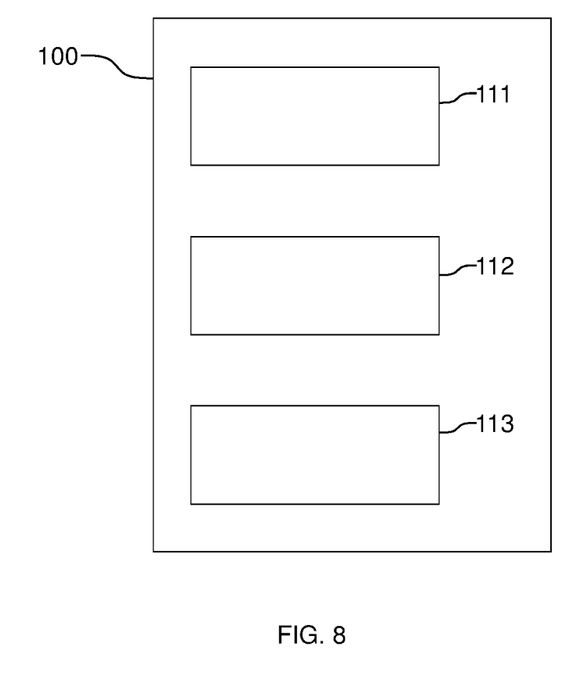
FIG. 8 shows a schematic block diagram of an example of a parking assistance system.

FIG. 7 shows a schematic block diagram of an exemplary embodiment of a method for operating a vehicle 100 (see FIGS. 1-5) by means of a parking assistance system 110 (see FIG. 1 or 8). The parking assistance system 110 is configured to drive the vehicle 100 along a trained trajectory TR (see FIGS. 2-6) in a following mode. The vehicle 100 preferably comprises a number of environmental sensors 120, 130 (see FIG. 1) for capturing the environment 200 (see FIG. 1) of the vehicle 100 and for outputting a corresponding sensor signal to the parking assistance system 110. The parking assistance system 100 is then preferably configured to carry out an automatic parking or following maneuver on the basis of the received sensor signals.

In a first step S1, the method comprises receiving the trained trajectory TR which in a training mode in which a manually navigated trajectory is recorded as the trained trajectory TR. In the training mode which is activated by a user of the vehicle 100, for example by means of a corresponding input, the parking assistance system 110 continuously records, for example, a position of the vehicle 100 in the environment 200, an arrangement of objects or obstacles O (see FIG. 6) relatively to the vehicle 100 as well as odometry data relating to the vehicle 100.

In particular, the odometry data comprise a current steering angle, a gas pedal position and a brake pedal position. The trained trajectory TR comprises at least one strongly curved section TA (see FIGS. 2-5), the radius of curvature R1, R2 of which (see FIG. 6) is smaller than a radius that can be achieved with the vehicle 100 with a maximum permissible steering lock predefined in the following mode.

In a second step S2, a starting point A (see FIGS. 2-5) and an end point E (see FIGS. 2-5) of the strongly curved section TA in the trained trajectory TR are defined. This can already take place during sensor-based recording or acquisition of the trajectory or only when the trained trajectory TR is selected or activated for following.

In a third step S3, a substitute trajectory ETR (see FIGS. 2-5) which connects a substitute starting point EA (see FIGS. 2-5) to a substitute end point EE (see FIGS. 2-5) is ascertained, wherein the substitute starting point EA and the substitute end point EP are each on the trained trajectory TR and the strongly curved section TA is between the substitute starting point EA and the substitute end point EE. In addition, a maximum curvature of the substitute trajectory ETR has a radius of curvature R1, R2 that can be achieved with the maximum permissible steering lock predefined in the following mode or with a smaller steering lock. The substitute trajectory ETR ascertained in this way can therefore be easily followed in the following mode.

FIG. 8 shows a schematic block diagram of an example of a parking assistance system 110. The parking assistance system 110 is installed, for example, in a vehicle 100 (see FIG. 1), such as an automobile or a truck. The parking assistance system 110 comprises a computing unit 111 for receiving a trained trajectory TR (see FIGS. 2-6) which is a trajectory navigated manually during a training mode, wherein the trained trajectory TR comprises at least one strongly curved section TA (see FIGS. 2-5), the radius of curvature R1, R2 of which (see FIG. 6) is smaller than can be achieved with the vehicle 100 with a maximum permissible steering lock predefined in the following mode. Furthermore, a determination unit 112 for determining a starting point A (see FIGS. 2-5) and an end point E (see FIGS. 2-5) of the strongly curved section TA in the trained trajectory TR and as ascertainment unit 113 for ascertaining a substitute trajectory ETR (see FIGS. 2-5) are provided. The ascertained substitute trajectory ETR connects a substitute starting point EA (see FIGS. 2-5) to a substitute end point EE (see FIGS. 2-5) which are each on the trained trajectory TR, wherein the strongly curved section TA is between the substitute starting point EA and the substitute end point EE. A maximum curvature of the substitute trajectory ETR has a radius of curvature R1, R2 (see FIG. 6) that can be achieved with the maximum permissible steering lock predefined in the following mode.

The respective unit, for example the computing unit 111, the determination unit 112 and/or the ascertainment unit 113, and the parking assistance system 110 can be implemented in the form of hardware and/or software. In the case of an implementation in the form of hardware, the unit may be, for example, in the form of a computer or a microprocessor. In the case of an implementation in the form of software, the unit may be in the form of a computer program product, a function, a routine, part of a program code or an executable object.

The parking assistance system 110 also preferably has interfaces, not illustrated, to environmental sensors 120, 130 which are arranged on the vehicle 100 and/or in the environment 200 and via which the parking assistance system 110 receives sensor signals which make it possible for the parking assistance system 110 to exactly estimate the position and/or location of the vehicle 100 and on the basis of which the parking assistance system 110 controls the vehicle 100. The ascertainment unit 113 is preferably also configured to take the received environmental sensor signals into account when ascertaining the substitute trajectory ETR.

Although the present invention has been described on the basis of exemplary embodiments, it may be modified in many ways.

LIST OF REFERENCE SIGNS

100 Vehicle
110 Parking assistance system
111 Computing unit
112 Determination unit
113 Ascertainment unit
120 Optical sensor
130 Ultrasonic sensor
A Starting point
AP Starting position
DIR Travel direction
DT Distance
E End point
EA Substitute starting point
EE Substitute end point
EP End position
ETA1 Substitute portion
ETA2 Substitute portion
ETR Substitute trajectory
KR1 Circle of curvature
KR2 Circle of curvature
NTA1 Starting portion
NTA2 End portion
O Obstacle
PP Parking position
R1 Radius of curvature
R2 Radius of curvature
RWTA Travel direction change section
S1 Method step
S2 Method step
S3 Method step
TA Strongly curved section
TR Trained trajectory
U1 Reversal point
U2 Reversal point
W1 Turning point
W2 Turning point
X1 Collision trajectory
X2 Collision trajectory

The invention claimed is:

1. A method for operating a vehicle by a parking assistance system having a microprocessor and which is configured, in a following mode, to drive the vehicle along a trained trajectory or to initiate driving, the method comprising:

receiving, by the microprocessor, the trained trajectory which in a training mode in which a manually navigated trajectory is recorded as the trained trajectory, wherein the trained trajectory comprises at least one strongly curved section, a radius of curvature of which is smaller than a radius that can be achieved with the vehicle with a maximum permissible steering lock predefined in the following mode, determining, by the microprocessor, a starting point and an end point of the strongly curved section in the trained trajectory, ascertaining, by a microprocessor, a substitute trajectory which connects a substitute starting point to a substitute end point if the vehicle deviates from the trained trajectory, wherein the substitute trajectory comprises a number of travel direction change sections, wherein each travel direction change section connects a first reversal point with a second reversal point so the substitute trajectory runs completely within the trained trajectory, wherein the substitute starting point and the substitute end point are each on the trained trajectory and the strongly curved section is between the substitute starting point and the substitute end point, and a maximum curvature of the substitute trajectory has a radius of curvature that can be achieved with the maximum permissible steering lock predefined in the following mode or with a smaller steering lock, wherein the parking assistance system controls a steering apparatus and carries out a control action on the vehicle based on the substitute trajectory.

2. The method as claimed in claim 1, wherein the substitute trajectory runs at least in sections within the strongly curved section, and/or in that the substitute trajectory has a section whose curvature is negative in comparison with the curvature of the strongly curved section.

3. The method as claimed in claim 1, wherein the substitute starting point is before the starting point of the strongly curved section on the trained trajectory in relation to a travel direction of the vehicle, and/or in that the substitute end point is after the end point of the strongly curved section on the trained trajectory in relation to the travel direction of the vehicle.

4. The method as claimed in claim 1, wherein the substitute trajectory is shorter than the strongly curved section.

5. The method as claimed in claim 1, wherein a maximum offset between the trained trajectory and the substitute trajectory is smaller than a predefined limit value.

6. The method as claimed in claim 1, wherein the substitute trajectory comprises at least one travel direction change section whose curvature is smaller than the curvature of the substitute trajectory at a section starting point of the travel direction change section.

7. The method as claimed in claim 1, wherein an opening angle between a first tangent to the substitute trajectory at a section starting point of a respective travel direction change section of the number of travel direction change sections and a second tangent to the trained trajectory at a point corresponding to the section starting point is greater than or equal to a predefined limit value.

8. The method as claimed in claim 1, wherein the substitute trajectory contains the travel direction change section in each case after a predefined distance along the substitute trajectory.

9. The method as claimed in claim 1, wherein the substitute trajectory has a negative curvature with respect to the strongly curved section in a starting portion, which directly follows the substitute starting point, and/or in an end portion which directly follows the substitute end point.

10. The method as claimed in claim 1, wherein the substitute starting point, the substitute end point and the substitute trajectory are ascertained by an iterative optimization method, wherein environmental sensor data which are provided by environmental sensors of the vehicle and/or by external environmental sensors are taken into account in the ascertainment.

11. The method as claimed in claim 1, wherein the vehicle is localized at a localization position on the trained trajectory which is in front of the starting point of the strongly curved section.

12. The method as claimed in claim 1, wherein a maximum permissible steering angle predefined in the following mode is different for left and right.

13. A non-transitory computer readable medium comprising instructions that, when a program is executed by a computer, cause said computer to perform the method as claimed in claim 1.

14. A parking assistance system for a vehicle which is configured, in a following mode, to drive the vehicle along a trained trajectory or to initiate driving, the parking assistance system comprising:

a microprocessor; and a memory card connected to the microprocessor, wherein the memory card comprises a program configured to perform a method comprising:

receiving the trained trajectory which is a trajectory navigated manually during a training mode, wherein the trained trajectory comprises at least one strongly curved section, a radius of curvature of which is smaller than a radius that can be achieved with the vehicle with a maximum permissible steering lock predefined in the following mode, determining a starting point and an end point of the strongly curved section in the trained trajectory, and ascertaining a substitute trajectory which connects a substitute starting point to a substitute end point if the vehicle deviates from the trained trajectory, wherein the substitute trajectory comprises a plurality of travel direction change sections, wherein the travel direction change section connects a first reversal point with a second reversal point so the substitute trajectory runs completely within the trained trajectory, wherein the substitute starting point and the substitute end point are each on the trained trajectory and the strongly curved section is between the substitute starting point and the substitute end point, and a maximum curvature of the substitute trajectory has a radius of curvature that can be achieved with the maximum permissible steering lock predefined in the following mode or with a smaller steering lock, wherein the parking assistance system controls a steering apparatus and carries out a control action on the vehicle based on the substitute trajectory.

15. The vehicle having the parking assistance system as claimed in claim 14.

* * * * *